Patented July 31, 1934

1,968,403

UNITED STATES PATENT OFFICE 1,968,403

SHREDDING TOBACCO STEMS

John C. Kinker, Jr., Richmond, Va.

No Drawing. Application August 8, 1933,
Serial No. 684,176

2 Claims. (Cl. 131—31)

My invention relates to the cutting or shredding of vegetable matter, etc., such as tobacco. It has for its object the perfecting of a process for the cutting and shredding of such vegetable matter as usually goes to waste or is used for unimportant purposes, so that it may obtain a better market. My invention has for its particular object the cutting or shredding of tobacco stems and tobacco leaf waste so that they may be reclaimed for use in the manufacture of cigars, cigarettes, smoking and other tobaccos. My process has been referred to in an application for United States Patent which I filed on December 15th, 1932; Serial Number 647,409; of which application this is a continuation in part. Broadly speaking my process for cutting or shredding this material is as follows: I first collect a quantity of the material, then sprinkle or spray it to give it the desired moisture content, and then by hydraulic or mechanical pressure compress the material into a hard and solid coherent block or mass. I then machine the solid block with a suitable cutting tool to produce the desired product, either shreds, or flakes, or other forms.

In carrying out my process it is important that the tobacco stems be sufficiently moistened before they are subjected to the pressure. They cannot always be obtained direct from the stemmery, and they will dry out to some extent in dry weather; or they will gain moisture in damp weather.

The most striking characteristic of the tobacco plant is its high content of mineral matter, commonly called the ash, and which amounts to as much as 25 per cent by weight, and averages more than 15 per cent by weight of the total weight of the dry leaf. There are present in tobacco three inorganic acids, and three bases. These vary in quantity in different tobaccos; and they also differ in their distributions and combinations. Such variations are due in a measure to the soil and climate in which the tobacco is produced, and upon the fertilizers used.

The following may be taken as an example of the ash of a leaf of average growth and sample (from "Chemistry of Tobacco Plant", Davidson, Bulletin 14, March 1892, Blacksburg, Virginia)—

| | |
|---|---|
| Moisture at 100° C | 7.62 |
| Crude ash | 21.59 |
| Phosphoric acid ($P_2O_5$) | 2.33 |
| Potash ($K_2O$) | 26.60 |
| Lime (CaO) | 25.21 |
| Magnesia (MgO) | 4.43 |
| Nitrogen | |
| Insoluble matter | 9.01 |

Very many analyses have been made of the various parts of the tobacco plant with a view to improving its cultivation; and though these analyses all show varying results, the analysis given above may be taken as a fair indication of the chemical constituents of the leaf. Analyses have also shown the presence of starch; sugars, derived from the starches; fatty and resinous substances; citric, oxalic, and malic acids; woody fibre; gums and oils; and the liquid which is characteristic of the plant—nicotine.

The grain of the tobacco leaf appears to the eye as minute pimples. We see it clearly on the ash of the cigar while burning. It exists in all types of tobacco in some degree. Though formed largely during the curing of the leaf, it is sometimes visible in the untreated leaf. Chemical analysis has proved that the grain is composed largely of calcium, in the form of the oxalate; with a little magnesium and potassium in combination with citric, malic and oxalic acids; and, some chemists have thought, nitric acid, in the form of potassium nitrate. Micro-photographs clearly show crystals in isolated cell groups; and it is believed that there is, during curing, a more or less complete aggregation of the grain-forming substances of all the cells into certain groups of cells, named isoblasts—a term used to designate certains cells or groups of cells whose contents differ from the general contents of surrounding cells. There are also small prismatic crystals distributed evenly through the leaf; one in nearly every cell of the mesophyll (mid-layers of leaf) and of the epidermis.

During the process of curing the tobacco, changes take place in the chemical constituents of the leaf. It is believed that these changes are the result of a life action; they occur only while the protoplasm of the leaf cell retains life. Mere drying does not result in curing. If the leaf be frozen, or poisoned, or even badly bruised, the protoplasm is killed and the curing process is checked or stopped. An important change during curing is the breaking up of starches into sugars. As the leaf dies, the chemical constituents present tend to pass back to the veins and to the stem. If the leaf has not been detached from the stalk they will recede even to that part. This movement also takes place during fermentation, which follows curing, after the death of the leaf cells. During fermentation an oxidizing process is set up which splits up the complex organic compounds which still exist in the leaf cells. During curing two important phenomena occur: respiration, or desire for water; and translocation, involving the movement of soluble materials from the leaf-web through the veins to the stem. In some cases an accumulation of sugars have been found in the stem; derived probably from the starch of the leaf web.

Nicotine, which may vary from less than 1 per cent to 7 per cent, and averaging around 5 per cent, of the dry substance of the tobacco, is an oily substance, colorless when pure. When boiled, at 240° C. a part distills over unchanged, and a part is decomposed, a strong resinous product remaining. By the action of light pure nicotine soon becomes yellow, then brown and thick; in which state on evaporation it leaves a brown resinous substance.

Cross sections taken from cured stems show an elongate cell structure, arranged in courses. Others show a cell structure, also elongate, arranged as the teeth of a comb, the dividing walls of which are attached to parallel filaments suggesting the legs of a ladder; the dividing walls of the cells suggesting the rungs. Sections taken from stems which have been subjected to the pressure used in my process show a more compact and symmetrical cell arrangement; as if the elongated cells had been ruptured or deformed. There may also be seen in the leaf and stem structures channels through which liquid constituents can flow.

I give this very brief review of some of the more important constituents of the tobacco plant, and of some of the phenomena of curing and of fermentation to show that I have good reasons to believe that when I take a bunch of moist stems, confine them, and subject them to a very heavy and sustained pressure, the original cell structure will be more or less broken down, the organic and inorganic constituents of the leaf and stem are more closely incorporated with the woody fibre and more thoroughly distributed, and that the woody fibre of the plant will be cemented together, more so than it is in the original plant, and more than it is when subjected to only a light pressure such as is used in the manufacture of plug tobacco, or in prizing tobacco before shipment. I have found that a moisture content of 15 per cent to 30 per cent is sufficient, though it may be a little above or below these figures. Most of the inorganic and some of the organic constituents of the tobacco leaf and stem are soluble in water and some are to a considerable extent cementitious. The addition of water or other suitable liquid before pressing is therefore helpful in distributing these constituents throughout the mass; and it is necessary to their cementing effect. In the claims I use the term ordering to cover this moistening. It also extends partly to the property of chemically combining and of mechanically diffusing with the constituents of the stem. In this specification I describe the condition of the block of pressed tobacco stems as solid to signify that it is hard, dense, and compact; but not so dense that it is without cells or pores. In pressing the tobacco stems into such a solid mass I have found that a pressure of 1250 to 1300 pounds per square inch gives satisfactory results. With some tobaccos I have used 1000 lbs. per square inch, and with others more than 1800 lbs. per square inch. I do not limit myself to these pressures; for it may be that I shall, by varying the moisture or the time of pressure, or both, be able to use lower pressures and produce a block of the hardness required.

In practice I use a hydraulic or toggle press to which is fitted a plunger of the desired form, and a die or pot in which the tobacco material is placed and is then pressed by the plunger. With some classes of tobacco it is desirable to maintain the pressure for a period, in which case I press it in a removable pot. I use a series of these containers, setting them one after another on the platen of the press ready for each succeeding charge. The shape of the pot may be either cylindrical or rectangular; and preferably its depth is greater than its diameter or width; the stroke of the plunger following the line of its depth. When it is desired to produce as large a block as possible; in carrying out the pressing operation the pot is filled with successive charges, each one being pressed down. When the last charge has been pressed down, the pressure is gradually increased to the desired limit, at which the pressure is held for a predetermined time governed by the nature and condition of the material being compressed. I do not confine or limit myself to the use of the hydraulic press or of the toggle press, or to a plunger or a ram press. I reserve the right to use any form of press with which I may be able to produce the block of tobacco material of sufficient hardness and density so that I may shred it in the manner described, and I reserve the right to carry out the compressing of the tobacco material in one or more steps, in one or more presses, of any type. I carry out the machining or shredding operation in a lathe, or in a machine having a rotating tool, or in one with a fixed tool across which the block is caused to travel. By taking fine cuts I produce fine shreds. By taking coarse cuts I produce a flaked product. In this specification I refer to the block as solid in the sense that it is compact, hard, dense. In other tobacco manufacturing processes in which tobacco is pressed the pressure is not sufficiently great, nor is it exerted for a sufficiently long time, to break down the walls and cells of the plant structure; and the block, as in the case of plug tobacco for instance, is not solid in the sense that my block of tobacco material is solid. Pressing to this degree of solidity is an important step in my process. I do not confine myself to any particular pressure; or to any particular duration of the pressure; but only to a pressure sufficient and sufficiently maintained to produce the solid block of tobacco material which is necessary to permit of the subsequent machining operation to give the desired form of product.

Nor do I specify any particular preparation of the tobacco material before subjecting it to pressure. As is well known, tobacco after cutting in the field, is hung in tobacco barns, where it cures. After curing, under which term I include other natural changes which may occur, such as fermentation, the tobacco is ordered, that is, brought to the proper condition of moisture for the stemming operation.

The development or preparation of tobacco begins with the seed. There follow the growing of the plant; the cutting; the curing and fermenting; the ordering; the stemming, by which process the stem is removed from the leaf. All of these steps are the every day functions of the tobacco grower and the tobacco manufacturer. I take the stems after the stemming operation, and except for the possible need of a little more moisture, in case the stems have dried out very much between the stemmery and my presses, I prepare them in no other way, and make no addition or admixture of adhesive or other material, liquid or solid, before I compress them into blocks, from which operation I turn them out ready for the shredding operation.

As I have said: before stemming, the moisture in the tobacco is brought up to a suitable level so that the stem may be easily removed and with least injury to the leaf. It is true that tobacco is never dry, unless it is dried by artificial heat. The plant is very hygroscopic, and absorbs moisture from the atmosphere rapidly. This is explained by a study of the cell structure and of the chemical constituents of the leaf and stem. Tobaccos are divided into classes, types and grades; according to their differences and their qualities. There are many types and grades, all differing in their chemical content, and in their capacity for absorbing moisture. A given tobacco, when it is delivered to a factory, may have a moisture content of anything from say 5 to 30 per cent. One tobacco holding 10 per cent of moisture may seem to be damp. Another tobacco holding the same percentage of moisture may be apparently dry. The weather changes; and all tobaccos will absorb or give up moisture, and in varying amounts. For these reasons I find it more satisfactory to order, or re-order, the tobacco stems before compressing them, so that the periods of compressing may be as uniform as possible, and not be upset by greatly varying amounts of moisture in the stems.

In the claims I have claimed the making of fine-cut tobacco from stems and the shredding of tobacco stems. The fine-cut referred to is tobacco stem material shredded in a thread like form, and cut from the block with a fine tool and with a fine feed. The shredded tobacco stem form includes the fine cut form and all grades and graduations of cut to a coarse cut made from the block with a coarser tool and a coarser feed.

I claim:

1. The process of treating tobacco stems which consists of ordering the stems; molding the stems under a pressure sufficient to partly break down the cell structure of the stems and so compress the mass into a block; then cutting the block into shreds.

2. The process of treating tobacco stems which consists of ordering the stems; molding the stems under a pressure sufficient to partly break down the cell structure of the stems and to cause a distribution of the moisture and of the chemical constituents; allowing the molded stems to partially dry; then reducing the molded stems to a shredded form.

JOHN C. KINKER, Jr.